United States Patent [19]

Katchman et al.

[11] 4,128,604
[45] Dec. 5, 1978

[54] POLYPHENYLENE ETHER COMPOSITIONS

[75] Inventors: Arthur Katchman, Delmar; Gim F. Lee, Jr., Albany, both of N.Y.

[73] Assignee: General Electric Company, Pittsfield, Mass.

[21] Appl. No.: 809,442

[22] Filed: Jun. 23, 1977

Related U.S. Application Data

[63] Continuation of Ser. No. 489,508, Jul. 18, 1974, abandoned, which is a continuation-in-part of Ser. No. 319,159, Dec. 29, 1972, abandoned, which is a continuation-in-part of Ser. No. 122,079, Mar. 8, 1971, abandoned, which is a continuation-in-part of Ser. No. 31,793, Apr. 24, 1970, abandoned.

[51] Int. Cl.$^2$ ............................................. C08L 51/04
[52] U.S. Cl. ............................. 260/876 R; 260/897 R
[58] Field of Search ................................ 260/897, 876

[56] References Cited

U.S. PATENT DOCUMENTS

| 3,383,435 | 5/1968 | Cizek | 260/874 |
| 3,487,127 | 12/1969 | Erchak et al. | 260/876 |
| 3,511,895 | 5/1970 | Kydonieus | 260/880 |

FOREIGN PATENT DOCUMENTS

| 564274 | 10/1958 | Canada | 260/880 |
| 824368 | 11/1959 | United Kingdom | 260/880 |
| 1002901 | 9/1965 | United Kingdom | 260/880 |
| 1013393 | 12/1965 | United Kingdom | 260/880 |

Primary Examiner—Carman J. Seccuro
Attorney, Agent, or Firm—Morgan, Finnegan, Pine, Foley & Lee

[57] ABSTRACT

There are provided high impact strength thermoplastic compositions comprising a polyphenylene ether and a rubber modified polystyrene resin. The compositions include a dispersed phase of rubber particles having a maximum mean diameter of 2 microns and preferably from about 0.5 to 2 microns; the composition contains greater than 22% by weight of a rubber gel phase on a polyphenylene ether-free basis; and the rubber comprises a polybutadiene having a cis-1,4 content of at least 50% by weight and a vinyl content of no more than 10% by weight. The compositions provide molded articles with substantial and unexpected improvements in impact resistance, surface appearance and resistance to aggressive solvent systems and the retention of impact strength at sub-zero temperatures is particularly outstanding.

19 Claims, No Drawings

POLYPHENYLENE ETHER COMPOSITIONS

This is a continuation of application Ser. No. 489,508, filed July 18, 1974; which in turn is a continuation-in-part of Ser. No. 319,159, filed Dec. 29, 1972; in turn a continuation-in-part of Ser. No. 122,079, filed Mar. 8, 1971, Ser. No. 139,215, filed Apr. 30, 1971 & Ser. No. 139,270, filed Apr. 30, 1971 each in turn a continuation-in-part of Ser. No. 31,793, filed Apr. 24, 1970, all now abandoned.

This invention relates to thermoplastic resin compositions and, more particularly, to high impact thermoplastic compositions comprising a polyphenylene ether and a rubber modified polystyrene resin.

BACKGROUND OF THE INVENTION

The polyphenylene ethers are known and described in numerous publications, including Hay, U.S. Pat. Nos. 3,306,874 and 3,306,875; and Stamatoff, U.S. Pat. Nos. 3,257,357 and 3,257,358, all incorporated herein by reference. The high molecular weight polyphenylene ethers are high performance engineering thermoplastics having relatively high melt viscosities and softening points, i.e., in excess of 275° C. They are useful for many commercial applications requiring high temperature resistance and can be formed into films, fibers and molded articles.

While possessing the above described desirable properties, it is also known that certain of the properties of the polyphenylene ethers are undesirable for some commercial uses. For example, parts molded from polyphenylene ethers have low impact strength because they are somewhat brittle. In addition, the relatively high melt viscosities and softening points are considered a disadvantage for many uses. Films and fibers can be formed from polyphenylene ethers on a commercial scale using solution techniques, but melt processing is commercially unattractive because of the required high temperatures needed to soften the polymer and the problems associated therewith such as instability and discoloration. Such techniques also require specially designed process equipment to operate at elevated temperatures. Molded articles can be formed by melt processing techniques, but, again, the high temperatures required are undesirable.

It is known in the art that the properties of the polyphenylene ethers can be materially altered by forming compositions with other polymers. For example, Finhlot, U.S. Pat. No. 3,379,792 discloses that flow properties of polyphenylene ethers are improved by preparing a composition thereof with from aboutt 0.1 to 25 parts by weight of a polyamide. In Gowan, U.S. Pat. No. 3,361,851, polyphenylene ethers are formed into compositions with polyolefins to improve impact strength and resistance to aggressive solvents. In Cizek, U.S. Pat. No. 3,383,435, incorporated herein by reference, Fox, U.S. Pat. No. 3,356,761, and Bostick et al, French Pat. No. 1,586,729, there are provided means to simultaneously improve the melt processability of the polyphenylene ethers and upgrade many properties of polystyrene resins. These patents disclose that polyphenylene ethers and vinyl materials, e.g., blended or grafted polystyrene resins, including many modified polystyrenes, are combinable in all proportions to provide compositions having many properties improved over those of either of the components. This invention provides compositions of the type disclosed broadly in such prior art, but with unexpectedly high impact strength.

Preferred embodiments of the Cizek patent are compositions comprising a rubber modified high-impact polystyrene and a poly(2,6-dialkyl-1,4-phenylene)ether. Such compositions are important commercially because they provide both an improvement in the melt processability of the polyphenylene ether and an improvement in the impact resistance of parts molded from the compositions. Furthermore, such compositions of the polyphenylene ether and the rubber modified high-impact polystyrene may be custom formulated to provide predetermined properties ranging between those of the polystyrene resin and those of the polyphenylene ether by controlling the ratio of the two polymers. The reason for this is that the Cizek compositions exhibit a single set of thermodynamic properties rather than the two distinct sets of properties, i.e., one for each of the components of the composition, as is typical with compositions or blends of the prior art.

The preferred embodiment of the Cizek patent is disclosed to comprise a poly(2,6-dimethyl-1,4-phenylene)ether and a rubber modified high-impact polystyrene (identified in Example 7 as Lustrex HT 88-1 of Monsanto Chemical Company). It is known in the art that Monsanto HT-88 high impact polystyrene contains an elastomeric rubber phase dispersed through a polystyrene matrix and that the particle size of the dispersed elastomer ranges from 2 to 10 microns with an average of 4 to 6 microns. This is shown, for example, in the photomicrograph in Vol. 19, Encyclopedia of Chemical Technology, 2nd Edition, 1969, page 94, FIG. 2(b). Moreover, the prior art high impact rubber modified polystyrenes comprise about 12–21% by weight of an elastomeric gel phase dispersed in a polystyrene matrix and, in Monsanto HT-88, a typical sample had a 20.7% rubber gel content. This is shown, e.g., in Table 3 of Vol. 13, Encyclopedia of Polymer Science and Technology, 1970, p. 401 et seq. In addition, it is known that rubber in high impact polystyrene like Monsanto HT-88 comprised a butadiene-based polymer and that the butadiene units in such polymers had a typical, high trans microstructure. Thus the preferred embodiment of the Cizek patent, which was disclosed to have a notched Izod impact strength ranging from 1.05 to 1.5 ft.-lbs./in. notch (Standard method, ASTM D-256) comprised a polyphenylene ether and a rubber modified high-impact polystyrene resin having a dispersed rubber gel phase with average particle size of about 4 to 6 microns, the polystyrene containing less than 21% by weight of a dispersed rubber gel phase, and the rubber being a butadiene-based polymer in which the microstructure of the polybutadiene was largely trans-1,4.

the Cizek patent claims compositions which dominate those of this application and its copending parents, although the present compositions are patentably distinguishable therefrom.

In particular, in copending application, Serial No. 122,079, it is disclosed that such compositions having a rubber particle size range averaging in the sub-2 micron range have higher impact strengths than the compositions specifically disclosed by Cizek. In copending application, Ser. No. 139,270 it is disclosed that such compositions in which the rubber is of a predominantly cis-1,4 microstructure have higher impact strengths than the compositions specifically disclosed by Cizek. In copending application, Serial No. 139,215, it is disclosed that such compositions in which the rubber gel content on a polyphenylene-free basis exceeds 22% by weight have higher impact strengths than the compositions specifically disclosed by Cizek.

Moreover, data are presented which demonstrate that the compositions of the three said copending applications are also patentably distinct from one another because (i) if the rubber particle size is maintained in a sub-2 micron average range while the cis-content is held below 50% and the rubber gel phase is held below 22%, ductile impact strength (Gardner) at room temperature and gloss both are better than that of a composition in which the particle size is greater than 2 microns;

(ii) if the rubber is >90% cis-1,4 polybutadiene while the average particle size is held above 2 microns and the rubber gel phase content is held below 22%, brittle impact strength (Izod) at room temperature is better than that of a composition in which the microstructure of the cis-1,4 polybutadiene is less than 50%; and (iii) if the rubber gel phase content is above 22% by weight on a polyphenylene ether-free basis while the cis-1,4 content is held below 50% and the rubber particle size is kept above 2 microns, average, the ductile impact strength (Gardner) at room temperature is improved and the percent retention of brittle impact (Izod) at −40° C. is better than that of a composition in which the rubber gel phase content is less than 22%.

The present compositions are patentably distinguishable over those specifically disclosed in Cizek patent because they have higher impact strengths. Moreover, they are patentably distinguishable over the compositions of the copending parent applications because the present compositions have a higher gloss, and a substantially higher brittle impact strength (Izod) at −40° C.

In addition to the enhanced impact strength, the present compositions have improved surface appearance, especially gloss, and much greater resistance to aggressive solvents, such as gasoline, in comparision with all other polyphenylene etherstyrene resin compositions of the prior art.

DESCRIPTION OF THE INVENTION

According to the present invention, in its broadest aspects, there are provided thermoplastic compositions with unexpectedly high impact resistance comprising a polyphenylene ether and a rubber modified polystyrene, the composition having a dispersed particulate phase having a maximum means particulate diameter of about 2 microns, preferably from 0.5 to 2 microns; a rubber phase gel content, on a polyphenylene ether-free basis, of at least 22% by weight; and wherein the rubber comprises a polybutadiene having a cis-1,4 content of at least 50% by weight and a vinyl content of no more than about 10% by weight. In general, the compositions according to this invention are prepared by combining said polyphenylene ether and a high cis-1,4 polybutadiene rubber modified polystyrene to obtain a composition having at least two phases, one of which is discontinuous and comprises rubber particles having a maximum average diameter of 2 microns, and the gel phase content recited above. Such compositions may be molded to shape using conventional molding procedures.

The compositions, which can comprise blends or grafts or other interpolymers of the polyphenylene ether component and the rubber modified polystyrene component, generally consist of a mixture of two phases, the continuous phase being a matrix of polyphenylene oxide resin and styrene resin in which there is a discontinuous phase dispersed comprising particles of rubber. Such particles may also include to varying extents, polystyrene resins and polyphenylene ether resins and grafts and interpolymers thereof, depending upon how the compositions are prepared. In any event, the size of the particles can be measured by means well known to those skilled in the art, e.g., either by phase contrast microscopy, which is especially convenient, or by microfiltration, and similar known methods. Similarly, gel phase content can be measured by methods well known to those skilled in the art. One convenient method comprises separating the gel phase from the rubber modified polystyrene by high speed centrifugation. A 5% by weight suspension of rubber modified polystyrene is kept in contact with a mixture of methyl ethyl ketone and acetone (50/50 by volume) for 90 minutes with mild shaking. Then it is centrifuged at 47,000 × G (19,500 r.p.m.). The gel phase is recovered by decanting and vacuum drying at 50° C. The rubber gel phase content is the percent by weight of dried gel based on the original weight of the rubber modified polystyrene. In cases where polyphenylene ether is present in the composition, a modification is necessary to provide a medium which dissolves both the polyphenylene ether and the styrene resin in the matrix, leaving the gel phase for decanting and drying. In one such technique, a 0.3 g. sample is suspended in 20 ml. of toluene and the suspension is mechanically shaken for 45 minutes then transferred to a weighed centrifuge tube, using a little fresh toluene to rinse the shaker vessel. Then the suspension is centrifuged, for example, at 12,000 r.p.m. for 20 minutes. The toluene supernatent is decanted and discarded, and the tube and gel are dried to a constant weight at 110° C. under a 5 psi vacuum. The net weight of the gel is determined and converted to wt.% on a polyphenylene ether-free basis. The microstructure of the polybutadiene can be determined also by means well known to those skilled in he art, e.g., by infrared analysis of the rubber separated from the composition. These calculations will provide the cis-1,4 content and 1,2-vinyl as a weight percent of the total unsaturated carbon-carbon double bonds in the rubber. The microstructure in the final composition will be basically that of the rubber used in its preparation.

As has been mentioned, the polystyrene resin modified with the elastomer can be combined with the polyphenylene ether in a number of ways. The specified particle size of the elastomer is provided, e.g., by polymerizing styrene in the presence of dissolved rubber under well known conditions whereby a phase comprising a microgel of, e.g., grafted, cross-linked rubber particles becomes dispersed in a polystyrene matrix. This is then combined with the polyphenylene ether and the size of the particle remains generally the same in the final composition.

The polyphenylene ethers with which this invention is concerned are fully described in the above-mentioned references. The polyphenylene ethers are self-condensation products of monohydric monocyclic phenols produced by reacting the phenols with oxygen in the presence of complex copper catalysts. In general, molecular weight will be controlled by reaction time, longer times providing a higher average number of repeating units.

A preferred family of polyphenylene ethers will have repeating structural units of the formula:

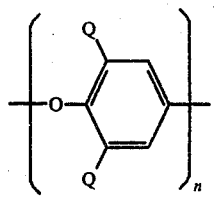

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

Illustrative members are: poly(2,6-dilauryl-1,4-phenylene)ether; poly(2,6-diphenyl-1,4-phenylene)ether; poly(2,6-dimethoxy-1,4-phenylene)ether; poly(2,6-diethoxy-1,4-phenylene)ether; poly(2-methoxy-6-ehtoxy-1,4-phenylene)ether; poly(2-ethyl-6-stearyloxy-1,4-phenylene)ether; poly(2,6-dichloro-1,4-phenylene)ether; poly(2-methyl-6-phenyl-1,4-phenylene)ether; poly(2,6-dibenzyl-1,4-phenylene)ether; poly(2-ethoxy-1,4-phenylene)ether; poly(2-chloro-1,4-phenylene)ether; poly(2,5-dibromo-1,4-phenylene)ether; and the like. Examples of polyphenylene ethers corresponding to the above formula can be found in the above referenced patents of Hay and Stamatoff.

For purposes of the present invention an especially preferred family of polyphenylene ethers include those having alkyl substitution in the two positions ortho to the oxygen ether atom, i.e., those of the above formula wherein each Q is alkyl, most preferably having from 1 to 4 carbon atoms. Illustrative members of this class are: poly(2,6-dimethyl-1,4-phenylene)ether; poly(2,6-diethyl-1,4-phenylene)ether; poly(2-methyl-6-ethyl-1,4-phenylene)ether; poly(2-methyl-6-propyl-1,4-phenylene)ether; poly(2,6-dipropyl-1,4-phenylene)ether; poly(2-ethyl-6-propyl-1,4-phenylene)ether; and the like.

The most preferred polyphenylene ether resin for purposes of the present invention is poly(2,6-dimethyl-1,4-phenylene)ether. This resin readily forms a compatible and single phase composition with polystyrene resins over the entire range of combining ratios.

In the present compositions, the polyphenylene ether is combined with a rubber-modified polystyrene. The term "polystyrene" is used herein in the same manner as defined in Cizek, U.S. Pat. No. 3,383,435. Such styrene resins will be combinable with the polyphenylene ether and, in general, on a rubber-free basis, will be selected from those having at least 25% by weight of the polymer units derived from a vinyl aromatic monomer, e.g., one having the formula:

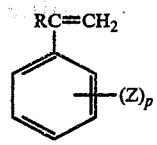

wherein R is hydrogen, (lower)alkyl, e.g., of from 1 to 4 carbon atoms or halogen; Z is hydrogen, vinyl, halogen or (lower)alkyl; and p is 0 or a whole number of from 1 to 5. Illustrative polystyrene components in the rubber modified polystyrene resins include homopolymers of polystyrene; polychlorostyrene; poly-α-methylstyrene; and the like; styrene-containing copolymers, such as styrene-acrylonitrile copolymers; copolymers of ethylvinylbenzene and divinylbenzene; styrene-acrylonitrile-α-methylstyrene terpolymers; and the like. Preferred polystyrene components in resins of this class are homopolystyrene; poly-α-methylstyrene; styrene-acrylonitrile copolymers; styrene-α-methylstyrene copolymer; styrene-methyl methacrylate copolymer; and poly-α-chlorostyrene. Especially preferred is homopolystyrene.

The term "rubber" as used herein contemplates predominantly cis-1,4 polybutadiene. The predominantly cis-1,4 polybutadiene should have at least 50% by weight of cis-1,4 groups and no more than 10% by weight of vinyl groups (due to 1,2-addition). These rubbers are made in known ways, e.g., by stereoregular polymerization of butadiene in inert hydrocarbon solutions using heterogeneous catalysts, such as chromium compounds adsorbed on inorganic supports or catalysts comprising the reaction products of metalloorganic compounds, e.g., trialkylaluminum with transition metal compounds, e.g., halogenides, and in particular titanium chlorides, iodides, and the like or lithium halogenides, and the like. In the preferred polybutadienes, the cis-1,4 content will be greater than 85% by weight of the polybutadiene and in especially preferred polybutadienes, the cis-1,4 content will be greater than 95% by weight.

The term "rubber modified polystyrene resin" contemplates a class of compounds comprising a two-phase system in which the rubber is polybutadiene, of greater than 50% cis-1,4 content and less than 16% vinyl content, dispersed in a polystyrene matrix in the form of discrete particles. The two-phase system will consist of interpolymers of a styrene monomer and an elastomer or rubber. Commercially, such high impact polystyrenes are usually made by grafting of rubber in the presence of polymerizing styrene. Such systems consist of a continuous phase of the polymerized styrene monomer in which the rubber or elastomer is dispersed in a discontinuous elastomeric gel phase, with or without grafted chains of polymerized styrene monomer. The particles may contain occluded, polymerized styrene monomer, too, and this has some bearing on their size.

Methods for preparing rubber modified polystyrenes of controlled particle size are known. For example, U.K. Pat. No. 1,174,214, mentioned above, polymerization of rubber in styrene monomer is carried out in bulk and the mixture is agitated during the beginning stages to form the desired particle size and then stirring is reduced and polymerization is completed. On the other hand, in the method of Bender, J. Appl. Polymer Sci., 9, 2887 (1965), a bulk pre-polymerization of rubber in styrene monomer is carried out with agitation until the desired particle size is obtained then water and surfactants are added and polymerization is completed in suspension.

Methods for preparing rubber modified polystyrenes of controlled elastomeric gel content are known. For example, in Amos et al U.S. Pat. No. 2,694,692, polymerization of rubber in a solution of styrene monomer is carried out in bulk and the mixture is agitated during the beginning stages to form the desired amount of gel particles and then stirring is reduced and polymerization is completed. On the other hand, in the method of Stein et al, U.S. Pat. No. 2,886,553, a bulk pre-polymerization of rubber in a solution of styrene monomer is carried out with heating, agitating until the desired gel content is obtained then water and surfactants are added and polymerization is completed in suspension. The rate of agitation in the pre-polymerization step in both processes controls the gel content. Merely by way of illustration, in a standard batch polymerization, in typical reaction equipment, stirring at 200 r.p.m. with 7% polybutadiene dissolved in styrene monomer provides an 18% gel content; at 35 r.p.m., the gel content is 37%; and without stirring, the gel content is 80%.

The methods to make polybutadienes with predominantly cis-1,4 microstructure have been mentioned above. In such materials the cis-1,4 content will preferably be at least 85% by weight, and especially preferably at least 95% by weight. These materials are also available commercially from a number of sources.

The rubber modified polystyrene resins preferably comprise those in which the elastomeric phase comprises particles of polystyrene grafted elastomeric gel. Preferably such resins will contain from about 70 to 99 parts by weight of polystyrene and 1 to 30 parts by weight of particulate polybutadiene elastomer-styrene graft copolymer gel phase, having a maximum mean diameter within the range of 0.5 to 2 microns. In such resins, the elastomer will be derived from a high cis-1,4polybutadiene, and will have a rubber gel phase content of from about 22 to about 80% by weight, preferably from 22 to 30% by weight, and especially preferably from 23.5 to 25.5% by weight. These materials can be made by well known methods, e.g., those cited above. They are also available commercially from a number of sources, e.g., Foster Grant, Inc., product designation No. 834.

As is described in Cizek, U.S. Pat. No. 3,383,435, polyphenylene ethers and polystyrene resins are combinable with each other in all proportions and they exhibit a single set of thermodynamic properties. The present compositions therefore can comprise from 1 to 99% by weight polyphenylene ether resin and from 99 to 1% polystyrene resin, on a rubber-free basis, and these are included within the scope of the invention. In general, compositions in which the polystyrene resin, on a rubber-free basis, comprises from 20 to 80% by weight of the polystyrene and the polyphenylene ether, are preferred because after molding they have the best combination of impact strength, surface appearance and resistance to solvents. Particularly useful and preferred are compositions in which the polystyrene resin, on a rubber-free basis, comprises from 40 to 60% by weight of the combined weight of the polystyrene and the polyphenylene ether. Properties, such as flexural strength, tensile strength, hardness and especially impact strength appear to be at a maximum in such preferred compositions.

The rubber content, i.e., the weight percentage of the dispersed rubber phase, in the instant compositions can vary, although no advantage is secured in exceeding a maximum of about 30% by weight of the total weight of the composition. If the rubber phase content falls below about 0.1% by weight, impact properties decline. The preferred range of rubber phase content is from about 1 to about 15% by weight. In all cases, the preferred amount of rubber phase will range between 1.5 and 8.5% of the total weight of the composition. Although, at higher levels, impact strength is clearly optimized, other properties, such as solvent resistance and appearance of molded parts are affected.

The method used to form the polyphenylene ether-polystyrenerubber compositions of the invention is not critical provided that it permits the maximum means size of the elastomer particles to be reduced to or maintained at 2 microns and preferably between 0.5 and 2 microns, and the gel phase content and polybutadiene microstructure to be retained in the specified ranges. The preferred method is one in which the polyphenylene ether is mixed with a rubber modified polystyrene using any conventional mixing methods and the composition as formed is molded to any desired shape such as by extrusion, hot molding or the like.

It should, of course, be obvious to those skilled in the art that other additives may be included in the present compositions such as plasticizers, pigments, flame retardant additives, reinforcing agents, such as glass filaments or fibers, stabilizers, and the like.

The following procedures illustrate the preparation of rubber modified polystyrenes of controlled particle size, rubber gel phase content and polybutadiene microstructure which are used for purposes of preparing compositions to demonstrate differences in the properties between the compositions of this invention and certain comparative examples:

PROCEDURE A

A control sample of polystyrene having a 36% cis-1,4-polybutadiene content, 9% of rubber, a mean particulate rubber phase diameter of 4 microns and an elastomeric gel phase content of 21 weight percent is prepared as follows:

A reactor is assembled, heated to 95° C. (bath temprature), and the following ingredients are added with the stirrer set at 300 r.p.m.

| Material | Grams |
| --- | --- |
| polybutadiene rubber (Firestone Diene-55 AC) | 108 |
| styrene | 1092 |
| Ionol (stabilizer) | 2.4 |
| benzoyl peroxide | 0.6 |
| dicumyl peroxide | 0.6 |
| tert-dodecyl mercaptan | 1.2 |

The temperature in the reactor rises from 80° C. to 95° C. during 3.5 hours, while the heating bath is gradually raised to 122° C. At this point the reaction product begins to get thick. Heating is continued for an additional hour to an internal temperature of about 104° C., whereupon a phase inversion takes place, and the product begins to climb the stirrer shaft slightly. At this point, there is a noticeable decrease in viscosity, rubber particles are observable under a microscope, and the solids content is 35% by weight. After an additional 20 minutes, the prepolymer is suspended by adding 2400 ml. of distilled water containing 2.4 g. NaCl; 0.72 g. of Naconal wetting agent; and 1.8 g. of polyvinyl alcohol (PVA 50–42), all at a temperature slightly above 80° C. The stirrer speed is increased to a maximum of about 1500 r.p.m. for about 5 minutes, then slowed down to about 800 r.p.m. The bath temperature is adjusted to 127° C. and the internal temperature is at 80° C. at the beginning of the suspension polymerization phase. During 16 hours, the bath temperature is increased to 155°–157° C. and the internal temperature reaches 100° C., and these conditions are maintained for an additional 4 hours and 15 minutes. The heating bath is removed, the suspension allowed to cool and the reactor contents are filtered on a porcelain funnel and cloth to isolate the polymer beads. The beads are washed with water and methanol and dried in a vacuum oven.

PROCEDURE B

A "high cis-1,4" polybutadiene modified polystyrene having greater than 90% cis-1,4 content, 9% rubber, a rubber particle diameter averaging 4 microns and an elastomeric gel phase of 18.5 weight percent is prepared as follows:

The reactin and general method of Procedure A is used with the following ingredients:

| Material | Grams |
| --- | --- |
| polybutadiene rubber (Taktene 1202, >90% cis-1,4) | 108 |
| styrene | 1092 |
| Ionol (stabilizer) | 2.4 |
| benzoyl peroxide | 0.6 |
| dicumyl peroxide | 0.6 |
| tertiary dodecyl mercaptan | 1.2 |

Prepolymerization is begun with stirring at 300 r.p.m. bath temperature of 112° C. and internal temperature of 66° C. During 5.5 hours, the bath temperature is maintained at 112°–117° C. and the internal temperature increases to 95° C., and the viscosity decreases (32.4% conversion and phase inversion). The prepolymer is then suspended in the medium described in Procedure A, stirred at 1500 r.p.m. for 5 minutes then reduced to 800 r.p.m., and the beads are suspension polymerized for 24 hours at 93°–117° C., then cooled, washed and isolated as described.

PROCEDURE C

A "low particle size" rubber modified polystyrene having a particulate diameter averaging 1.5 microns, 9% by weight of polybutadiene having a 36% cis-1,4microstructure and 21.5% of a rubber gel phase in the polystyrene is prepared with the reactor and general method according to Procedure A, using the following ingredients:

| Material | Grams |
| --- | --- |
| polybutadiene rubber (Firestone Diene-55 AC) | 108 |
| styrene | 1092 |
| Ionol (stabilizer) | 2.4 |
| azobis-(2-methylpropionitrile) | 0.45 |
| dicumyl peroxide | 0.60 |
| tertiary dodecyl mercaptan | 0.21 (ml.) |

Prepolymerization is begun with stirring at 800 r.p.m.. bath temperature of 110° C. and internal temperature of 72° C. During 5 hours, the bath temperature is maintained and the internal temperature increases to 85° C., then decreases to 83° C. and the viscosity decreases (phase inversion). The preopolymer is stirred at 1500 r.p.m. for 15 minutes and at 750 r.p.m. for 1.5 hours, (the rubber particles are observed to be very samll under the microscope). The prepolymer is then suspended in the medium described in Procedure A and the beads are suspension polymerized for 17 hours at 90°–93° C., then cooled, washed and isolated as described.

PROCEDURE D

A "high gel phase38 rubber modified polystyrene containing 32% by weight of particulate rubbergel phase, 9% by weight of polybutadiene having a 36% cis-1,4microstructure and a particulate diameter of 2.5 microns is prepared in the reactor by general method of Procedure A with the following ingredients:

| Material | Grams |
| --- | --- |
| polybutadiene rubber (Firestone Diene-55 AC) | 108 |
| styrene | 1092 |
| Ionol (stabilizer) | 2.4 |
| azobis-(2-methylpropionitrile) | 0.45 |
| dicumyl peroxide | 0.60 |

Prepolymerization is begun with stirring at 300 r.p.m., bath temperature of 110° C. an internal temperature of 72° C. After 2 hours and ten minutes, the bath temperature reaches 112° C. and the internal temperature increases to 90° C., and the conversion of styrene monomer to polystyrene reaches 24.9%. The temperature drops to 83° C. and after an additional 1 hour and 5 minutes, the suspending medium described in Procedure A is added to the prepolymer. The stirrer speed is increased to 1500 r.p.m. for 5 minutes then reduced to about 800 r.p.m. and the bath temperature is raised to 147° C. and the beads are suspension polymerized for 20 hours at about 102° C. The mixture is then cooled, washed and isolated,as described in Procedure A.

DESCRIPTION OF THE PREFERRED EMBODIMENTS

The invention will be further illustrated by the following examples wherein, unless otherwise indicated, all compositions are prepared by passing mixtures of the polyphenylene ether and the high-impact polystyrene and other ingredients, if present, through a variable pitch, single screw extruder with extrusion temperature maintained between about 500° and 600° F. All parts are by weight. The strands emerging from the extruder are cooled, chopped into pellets and molded into test bars using standard procedures.

EXAMPLE 1

The following formulation is blended:

| Material | Parts by weight |
| --- | --- |
| poly(2,6-dimethyl-1,4-phenylene)ether | 45 |
| rubber modified polystryene* | 55 |
| polyethylene | 1.5 |
| tridecyl phosphite | 0.5 |
| Acrawax (mold release and lubricant) | 0.25 |
| titanium dioxide | 2 |

*rubber is 9% by weight of polybutadiene having >90% cis-1,4 microstructure, dispersed as a styrene grafted rubber phase having a mean particle diameter of 2 microns, and the polystyrene containing 24% by weight of a rubber gel phase.

The composition is extruded in a 1-inch Wayne extruder using 580° F. for front/rear/die temperatures. Pellets chopped from the extrudate are molded using a 3 oz. Newbury molding machine under the following conditions: 500° F. for the rear/front/die temperatures; 170° F. mold temperature; an 8 second injection time; and a 35 second cycle time.

The molded workpieces are examined for surface appearance and the physical properties are measured by standard procedures.

For comparison purposes, the procedure is repeated, substituting, respectively, for the rubber modified polystyrene of this Example 1, the "high cis" rubber modified polystyrene of Procedure B; the "low particle size" rubber modified polystyrene of Procedure C; and the "high gel phase" rubber modified polystyrene of Procedure D.

The formulations and properties of the compositions are summarized in the Table.

Table

PROPERTIES OF COMPOSITIONS OF POLYPHENYLENE AND RUBBER MODIFIED POLYSTYRENES

| Example | 1 | 1B* | 1C* | 1D* |
|---|---|---|---|---|
| Formulation (parts by weight) | | | | |
| poly(2,6-dimethyl-1,4-phenylene)ether | 55 | 55 | 55 | 55 |
| rubber modified polystyrene, 9%, polybutadiene, >90% cis-1,4; 24% gel phase; 2 micron particle size | 45 | — | — | — |
| rubber modified polystyrene, 9% polubutadiene, >90% cis-1,4; 18.5% gel phase; 4 micron particle size | — | 45 | — | — |
| rubber modified polystyrene, 9% polybutadiene, 36% cis-1,4; 21.5% gel phase; 1.5 micron particle size | — | — | 45 | — |
| rubber modified polystyrene, 9% polybutadiene, 36% cis-1,4; 32% gel phase; 2.5 micron particle size | — | — | — | 45 |
| Properties | | | | |
| Tensile strength, psi | 7680 | 7840 | 8180 | 8720 |
| Elongation, % | 52 | 105 | 93 | 89 |
| Notched Izod impact, ft.-lbs./in. | | | | |
| at 23° C | 5.22 | 5.71 | 3.84 | 3.34 |
| at −40° C. | 2.48 | 1.62 | 1.23 | 1.60 |
| Ductile Impact, Gardner, in.-lbs. | | | | |
| at 23° C. | 200 | 135 | 211 | 183 |
| at −40° C. | 30 | 10 | 30 | 30 |
| Gloss, Gardner | 56 | 30 | 55 | 45 |

*Controls

In comparison with the controls, it can be seen that the composition according to Example 1 of this invention has the highest gloss and the brittle impact strength (Izod) at −40° C. is outstandingly good.

These results demonstrate that control of the three parameters; particle size, gel phase content and polybutadiene microstructure, to values within the limits specified herein provides properties better than those which can be obtained by varying each one of the three parameters, independently. Thus the compositions provided by the present invention are patentably distinguishable over those of the copending applications, above mentioned.

EXAMPLE 2

Fifty pounds of the following formulation is blended:

| Material | Parts |
|---|---|
| Poly(2,6-dimethyl-1,4-phenylene)ether* | 45 |
| Rubber modified polystyrene** | 55 |
| Polyethylene | 1.5 |
| Tridecylphosphite | 0.5 |
| Acrawax | .25 |
| Titanium dioxide | 2 |

*General Electric Company, PPO polyphenylene ether, in pellet form
**Foster-Grant, Inc., No. 834 high-impact polystyrene, in pellet form, having a dispersed elastomeric phase with a mean particle size of 1-2 microns; a gel phase content of 24 wt.% and a polybutadiene content of about 9% by weight, and polybutadiene having >99% of the cis-1,4 microstructure and <10% of vinyl.

The mixture is extruded in a 2-½ inch Prodex extruder. The resultant strands are cooled, chopped into pellets and molded into test specimens. The mean particle size of the elastomeric phase in the composition remains 1-2 microns.

The following physical properties are obtained:

| Izod impact (ft.-lbs./in. notch) | 5.7 |
|---|---|
| Gardner impact (in.-lbs.) | 240 |
| Elongation to failure (%) | 48 |
| Heat distortion temp. (264 psi) ° F. | 254 |
| Tensile yield str. (psi) | 9,500 |
| Tensile ultimate str. (psi) | 8,400 |
| 45° Gloss value | 62 |
| Flexural modulus (psi) | 350,200 |
| Flexural strength (psi) | 27,259 |

For purposes of comparison, the procedure of Example 1 is repeated substituting for the Foster-Grant No. 834, Monsanto HT-91 rubber modified high-impact polystyrene having dispersed elastomeric phase with a mean particle size of about 6 microns (range 2–10), a rubber phase gel content of about 19.8% by weight and a polybutadiene content of about 9% by weight, the polybutadiene having a cis-1,4 microstructure of 35 to 40% by weight. The composition contains, after mixing, elastomeric phase with particle size of about 6 microns. The following physical properties are obtained:

| Izod impact (ft.-lbs./in. notch) | 1.8 |
|---|---|
| Gardner impact (in.-lbs.) | 200 |
| Elongation to failure (%) | 51 |
| Heat distortion temp. (264 psi) ° F. | 268 |
| Tensile yield str. (psi) | 9,700 |
| Tensile ultimate str. (psi) | 8,200 |
| 45° Gloss value | 59 |
| Flexural modulus (psi) | 380,900 |
| Flexural strength (psi) | 30,460 |

A comparison of the results demonstrates a substantial improvement in impact strength as measured in the Izod and Gardner tests as well as surface appearance (as indicated from the gloss value) in the composition according to this invention.

EXAMPLE 3

Fifty pounds of the following self-extinguishing formulation is blended:

| Material | Parts |
|---|---|
| Poly(2,6-dimethyl-1,4-phenylene)ether* | 50 |
| Rubber modified polystyrene** | 50 |
| Polyethylene | 1.5 |
| Triphenylphosphate | 3.0 |
| Tridecylphosphite | 1.0 |
| Zinc Sulfide | 1.5 |
| 30% Styrene Master Batch Black | 0.5 |

*as specified in Example 2
**as specified in Example 2

After extrusion in a 2-½ inch Prodex extruder, the strands are cooled, chopped and molded into test bars by conventional procedures. The following physical properties are obtained:

| | |
|---|---|
| Izod impact (ft.-lbs./in. notch) | 5.1 |
| Gardner impact (in.-lbs.) | 175 |
| Elongation to failure (%) | 49 |
| Heat distortion temp. (264 psi) ° F. | 251 |
| Tensile yield str. (psi) | 9,100 |
| Tensile ultimate str. (psi) | 8,200 |
| Flexural modulus (psi) | 341,800 |
| Flexural strength (psi) | 26,015 |

For comparative purposes, the procedure of Example 3 is repeated, substituting for Foster-Grant No. 834, high-impact polystyrene HT-91 as used in Comparative Example 2. The final composition has a particle size in the same range. The following physical properties are obtained:

| | |
|---|---|
| Izod impact (ft.-lbs./in. notch) | 1.8 |
| Gardner impact (in-lbs.) | 120 |
| Elongation to failure (%) | 40 |
| Heat distortion temp. (264 psi) ° F. | 250 |
| Tensile yield str. (psi) | 9,350 |
| Tensile ultimate str. (psi) | 8,300 |
| Flexural modulus (psi) | 339,260 |
| Flexural strength (psi) | 30,860 |

A comparison of the results demonstrates a substantial improvement in impact strength in the composition according to this invention.

EXAMPLE 4

Fifty pounds of the following self-extinguishing formulation is blended:

| Material | Parts |
|---|---|
| Polyphenylene ether* | 40 |
| High impact polystyrene** | 60 |
| Polyethylene | 1.5 |
| Tridecylphosphite | 0.5 |
| Triphenylphosphate | 9 |
| Teflon | 0.1 |

*As specified in Example 2
**As specified in Example 2

After extrusion in a 2-½ inch Prodex extruder, the strands are cooled, chopped and molded into test specimens by conventional procedures. The following physical properties are obtained:

| | |
|---|---|
| Izod impact (ft.-lbs./in. notch) | 5.3 |
| Gardner impact (in.-lbs.) | >240 |
| Elongation to failure (%) | 55 |
| Heat distortion temp. (264 psi) ° F. | 219 |
| Tensile yield str. (psi) | 8,000 |
| Tensile ultimate str. (psi) | 7,420 |
| 45° Glass value | 61.5 |

For comparative purposes the procedure of Example 4 is repeated, substituting for the Foster-Grant No. 834, Monsanto HT-91 high impact polystyrene as specified in Comparative Example 2. The following physical properties are obtained:

| | |
|---|---|
| Izod impact (ft.-lbs./in. notch) | 1.8 |
| Gardner impact (in.-lbs.) | 50 |
| Elongation to failure (%) | 42 |
| Heat distortion temp. (264 psi) ° F. | 210 |
| Tensile yield str. (psi) | 8,600 |
| Tensile ultimate str. (psi) | 7,200 |

A comparison of the results demonstrates a substantial improvement in impact strength in the composition according to the present invention.

EXAMPLE 5

Fifty pounds of the following formulation is blended:

| Material | Parts |
|---|---|
| Polyphenylene ether* | 30 |
| High-impact polystyrene** | 70 |
| Polyethylene | 1.5 |
| Tridecylphosphite | 0.5 |
| Triphenylphosphate | 6 |

*As specified in Example 2
**As specified in Example 2

After extrusion in a 2-½ inches Prodex extruder, the strands are cooled, chopped into pellets and molded into test specimens by conventional techniques. This composition, which contains about 68% by weight of styrene resin (rubber-free basis) based on combined styrene resin, rubber-free, and polyphenylene ether and about 5.8% of dispersed elastomeric phase 1-2 microns particulate diameter, has a higher impact strength (4.9 vs. 1.7) than that reported for similar compositions in the prior art, made from rubber modified polystyrene in which the particle size is from 2-10 microns (Cizek, U.S. Pat. No. 3,383,435). The following physical properties are obtained:

| | |
|---|---|
| Izod impact (ft.-lbs./in. notch) | 4.9 |
| Heat distortion temp. (264 psi) ° F. | 227 |
| Elongation to failure (%) | 44 |
| Tensile yield str. (psi) | 7,500 |

EXAMPLE 6

Fifty pounds of the following formulation are blended:

| Material | Parts |
|---|---|
| Polyphenylene ether* | 25 |
| High-impact polystyrene** | 75 |
| Polyethylene | 1.5 |
| Tridecylphosphite | 0.5 |
| Triphenylphosphate | 6 |

*As specified in Example 2
**As specified in Example 2

After extrusion in a 2-½ inch Prodex extruder, the strands are cooled, chopped into pellets and molded into test specimens. The following physical properties are obtained:

| | |
|---|---|
| Izod impact (ft.-lbs./in. notch) | 4.0 |
| Elongation to failure (%) | 34 |
| Heat distortion temp. (264 psi) ° F. | 223 |
| Tensile yield str. (psi) | 7,500 |
| Tensile ultimate str. (psi) | 7,200 |

A similar composition from the prior art, but in which Monsanto HT-88 high-impact polystyrene was used, with particle size of 2-10 microns, and rubber gel phase content of about 20.7% by weight (Cizek, U.S. Pat. No. 3,383,435, Example 7 and FIG. 18) had an impact strength of only about 1.7 ft.-lbs./in. notch.

Test bars prepared from the formulations of Examples 2 and 3 immersed in gasoline at 1% strain did not undergo catastrophic failure after 15 minutes when the particle size averaged from 1 to 2 microns; the gel phase content was 24 wt.% (polyphenylene ether-free basis) and the polybutadiene had a cis-1,4 microstructure of >90% of the total unsaturation. By comparison, test bars prepared from the formulations wherein the particle sizes were larger, and the gel phase content was lower, and cis-1,4 polybutadiene microstructure was 30-40% by weight all failed (catastrophic failure) in less than 15 seconds at 1% strain in gasoline

EXAMPLE 7

The following polyphenylene ethers are substituted for poly(2,6-dimethyl-1,4-phenylene)ether in the formulation of Example 1:
poly(2,6-diethyl-1,4-phenylene)ether;
poly(2-methyl-6-ethyl-1,4-phenylene)ether;
poly(2-methyl-6-propyl-1,4-phenylene)ether;
poly(2,6-dipropyl-1,4-phenylene)ether
poly(2-ethyl-6-propyl-1,4-phenylene)ether.

Compositions according to this invention are obtained.

EXAMPLE 8

The rubber modified homopolystyrene used in Example 2 is replaced with rubber modified styrene resins of the following type:
poly-α-methylstyrene;
styrene-acrylonitrile copolymer (27% ACN);
styrene-α-methylstyrene copolymer;
styrene-methyl methacrylate copolymer;
poly-α-chlorostyrene; and
styrene-acrylinitrile-α-methylstyrene terpolymer.

Compositions according to this invention are obtained.

Obviously, other modifications and variations of the present invention are possible in the light of the above teachings. It is, therefore, to be understood that changes may be made in the particular embodiments of the invention described which are within the full intended scope of the invention as defined by the appended claims.

We claim:
1. A high impact strength thermoplastic composition comprising
(a) a polyphenylene ether and
(b) a rubber modified polystyrene resin,
said composition having a dispersed particulate rubber phase in which the particles have a maximum mean diameter of about 2 microns, said composition containing not substantially less than about 22% by weight of a particulate rubber gel phase, on a polyphenylene ether-free basis, dispersed in a polystyrene matrix, and said rubber comprising a polybutadiene having a cis-1,4 content of at least 50% by weight and a vinyl group content of no more than 10% by weight of said polybutadiene.

2. A composition as defined in claim 1 wherein the mean diameter of the dispersed elastomeric particles is from about 0.5 microns to about 2 microns.

3. A composition as defined in claim 1 wherein said particulate rubber gel phase comprises from about 22 to about 80% by weight of said composition, on a polyphenylene ether-free basis.

4. A composition as defined in claim 3 wherein said particulate rubber gel phase comprises from about 22 to about 30% by weight of said composition, on a polyphenylene ether-free basis.

5. A composition as defined in claim 4 wherein said particulate rubber gel phase comprises from about 23.5 to about 25.5% by weight of said composition, on a polyphenylene ether-free basis.

6. A composition as defined in claim 1 wherein said polybutadiene has a cis-1,4 content of at least 85% by weight.

7. A composition as defined in claim 6 wherein said polybutadiene has a cis-1,4 content of at least 95% by weight.

8. A composition as defined in claim 1 wherein said polystyrene resin, on a rubber-free basis, comprises from 20 to 80% by weight of the combined weight of said polystyrene resin, on a rubber-free basis, and said polyphenylene ether.

9. A composition as defined in claim 8 wherein said polystyrene resin, on a rubber-free basis, comprises from 40 to 60% by weight of the combined weight of said polystyrene resin, on a rubber-free basis, and said polyphenylene ether.

10. A composition as defined in claim 1 wherein the rubber phase comprises from 0.1 to 30% of the total weight of said composition.

11. A composition as defined in claim 10 wherein the rubber phase comprises from 1 to 15% of the total weight of said composition.

12. A composition as defined in claim 11 wherein the rubber phase comprises from 1.5 to 8.5% of the total weight of said composition.

13. A composition as defined in claim 1 wherein said rubber phase comprises particles of a polystyrene grafted elastomer gel.

14. A composition as defined in claim 13 wherein said rubber modified polystyrene comprises from 70-99 parts by weight of polystyrene and 1-30 parts by weight of a polybutadiene elastomer-styrene graft copolymer.

15. A composition as defined in claim 14 wherein the mean particulate diameter of said graft copolymer phase is from about 0.5 microns to about 2 microns.

16. A composition as defined in claim 14 wherein the graft copolymer phase comprises from 1.5 to 8.5% of the total weight of said composition.

17. A composition as defined in claim 1 wherein said polyphenylene ether has the repeating structural formula:

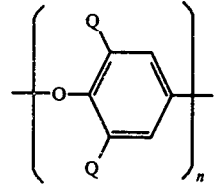

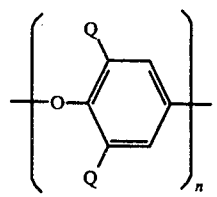

wherein the oxygen ether atom of one unit is connected to the benzene nucleus of the next adjoining unit, $n$ is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen and the phenyl nucleus.

18. A composition as defined in claim 17 wherein each Q is alkyl having from 1 to 4 carbon atoms.

19. A composition as defined in claim 18 wherein each Q is methyl.

* * * * *

UNITED STATES PATENT AND TRADEMARK OFFICE
CERTIFICATE OF CORRECTION

PATENT NO. : 4,128,604
DATED : December 5, 1978
INVENTOR(S) : Arthur Katchman and Gim F. Lee, Jr.

It is certified that error appears in the above-identified patent and that said Letters Patent are hereby corrected as shown below:

Column 1, line 51, "aboutt" should read --about--.

Column 2, line 53, "the" should read --The--.

Column 5, line 28, "ehtoxy" should read --ethoxy--.

Column 7, line 40, "1,4polybutadiene" should read --1,4 polybutadiene--.

Column 8, line 15, "polystyrenerubber" should read --polystyrene-rubber--.

Column 8, line 24, "as", first occurrence, should read --so--.

Column 8, line 46, "tempra-" should read -- tempera- --.

Column 9, line 24, "reactin" should read --reaction--.

Column 9, line 50, "cis-1,4mi-" should read -- cis-1,4 mi- --.

UNITED STATES PATENT AND TRADEMARK OFFICE
CERTIFICATE OF CORRECTION

PATENT NO. : 4,128,604
DATED : December 5, 1978
INVENTOR(S) : Arthur Katchman and Gim F. Lee, Jr.

It is certified that error appears in the above-identified patent and that said Letters Patent are hereby corrected as shown below:

Column 10, line 3, "samll" should read --small--.

Column 10, line 10, "phase38" should read --phase"--.

Column 10, line 11, "rubbergel" should read --rubber gel--.

Column 10, line 13, "cis-1,4microstructure" should read --cis-1,4 microstructure--.

Column 10, line 26, "an" should read --and--.

Column 12, line 9, "99%" should read --90%--.

Column 14, line 17, "inches" should read --inch--.

Column 15, line 10, insert a period at the end of the sentence.

Column 16, lines 55-65, delete the redundant formula.

Signed and Sealed this

Fourth Day of December 1979

[SEAL]

Attest:

SIDNEY A. DIAMOND

Attesting Officer     Commissioner of Patents and Trademarks